US009145083B2

(12) United States Patent
Samra

(10) Patent No.: US 9,145,083 B2
(45) Date of Patent: Sep. 29, 2015

(54) PLATFORM SHIPPING RACK CART FOR GLASS SHEETS

(71) Applicant: Guardian Industries Corp., Auburn Hills, MI (US)

(72) Inventor: Bikramjit Singh Samra, Fresno, CA (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 14/144,734

(22) Filed: Dec. 31, 2013

(65) Prior Publication Data

US 2015/0183359 A1 Jul. 2, 2015

(51) Int. Cl.
| | |
|---|---|
| *A47G 19/08* | (2006.01) |
| *B60P 3/00* | (2006.01) |
| *B60D 1/06* | (2006.01) |
| *B62B 5/00* | (2006.01) |
| *B65D 85/48* | (2006.01) |

(52) U.S. Cl.
CPC . *B60P 3/002* (2013.01); *B60D 1/06* (2013.01); *B62B 5/0093* (2013.01); *B65D 85/48* (2013.01)

(58) Field of Classification Search
CPC .......... B65G 49/062; B65G 1/02; B65G 7/08; B65G 57/20; B65D 19/44; B65D 88/123; B65D 88/129; B65D 19/002; B65D 85/48; B65D 85/46; B65D 85/68; B65D 2519/00333; B65D 2519/00288; B65D 2519/00293; B65D 2519/00059; B65D 2519/00024; B65D 2519/00233; B65D 2519/00164; B65D 2519/00298; B65D 19/395; B65D 19/40; B65D 19/38; B65D 19/0095; B65D 71/0092; B65D 25/24; B65D 21/023; B65D 21/06; B65D 21/062; B65D 21/066; B62B 5/0093; B60P 3/002; F16M 13/02; A47B 45/00; A47B 47/02; A47B 47/021; A47B 47/027; A47B 47/0058; A47B 47/0091; A47B 96/025; A47B 87/00; A47B 87/02; A47B 87/0207; A47B 57/0215; A47B 87/0223; A47B 87/0246; A47B 87/0253; A47B 87/0269; A47B 87/0276; A47B 87/0284; A47B 87/0292; B60D 1/06
USPC .................. 211/41.14, 59.4, 60.1, 70.4, 13.1, 211/71.01; 108/51.11, 55.1, 55.3; 206/454, 206/448

See application file for complete search history.

(56) References Cited

U.S. PATENT DOCUMENTS

| | | | | | |
|---|---|---|---|---|---|
| 1,963,242 | A | * | 6/1934 | Nelson | ............................ 432/259 |
| 2,539,809 | A | * | 1/1951 | Buckley | ........................ 211/59.4 |
| 3,193,093 | A | * | 7/1965 | Hansen | ........................ 206/451 |
| 3,857,494 | A | * | 12/1974 | Giardini | ........................ 211/194 |
| 3,878,942 | A | * | 4/1975 | Hansen et al. | ................. 206/454 |
| 3,887,071 | A | * | 6/1975 | Thomaswick | ................ 206/454 |
| 4,014,435 | A | | 3/1977 | Rowley et al. | |

(Continued)

*Primary Examiner* — Jennifer E Novosad
(74) *Attorney, Agent, or Firm* — Nixon & Vanderhye P.C.

(57) ABSTRACT

A platform shipping rack cart for shipping rack(s) supporting glass sheets is provided. The cart may include a plurality of upwardly extending locator projections (e.g., pins) for engaging L-frame racks that hold glass sheets, so as to allow the L-frame rack(s) to be positioned and securely mounted on the cart for shipping and the like. The locator projections are arranged so that first and second L-frame racks may be provided on the cart either facing each other, or in back-to-back position, as desired. The cart advantageously allows multiple L-shaped glass racks to be stabilized on the cart and moved at a given time, and allows for loading the glass in either lengthwise or sideways orientations into vans or the like.

20 Claims, 16 Drawing Sheets

(56) References Cited

U.S. PATENT DOCUMENTS

| | | | | |
|---|---|---|---|---|
| 4,368,822 A | * | 1/1983 | Kramer et al. | 211/85.8 |
| 4,747,495 A | * | 5/1988 | Hoss | 211/85.8 |
| 4,915,033 A | * | 4/1990 | Bond | 108/55.1 |
| 4,977,836 A | * | 12/1990 | Bond | 108/55.1 |
| 5,193,700 A | * | 3/1993 | Lyman et al. | 220/1.5 |
| 5,297,485 A | * | 3/1994 | Bond | 108/55.1 |
| 5,299,699 A | * | 4/1994 | Cole | 211/187 |
| 5,404,821 A | * | 4/1995 | Bond | 108/55.1 |
| 5,411,360 A | * | 5/1995 | Hilliker et al. | 414/608 |
| 5,497,708 A | * | 3/1996 | Jeruzal | 108/54.1 |
| 6,102,206 A | | 8/2000 | Pride | |
| 6,202,863 B1 | * | 3/2001 | Grenier | 211/70.4 |
| 6,247,601 B1 | * | 6/2001 | Norton et al. | 211/41.14 |
| 6,783,010 B1 | * | 8/2004 | Berger | 211/41.14 |
| 6,820,752 B2 | | 11/2004 | Jeskey et al. | |
| 6,910,591 B2 | | 6/2005 | Knoll et al. | |
| 7,044,066 B1 | * | 5/2006 | Miller | 108/55.3 |
| 7,080,600 B2 | * | 7/2006 | Jurdens | 108/55.1 |
| 7,426,995 B2 | * | 9/2008 | Cho | 206/319 |
| 7,958,999 B2 | * | 6/2011 | Noda et al. | 206/454 |
| 8,092,127 B2 | * | 1/2012 | Gao et al. | 410/46 |
| 8,210,374 B2 | * | 7/2012 | Harpole | 211/195 |
| 8,752,716 B2 | * | 6/2014 | Gibson et al. | 211/41.14 |
| 2003/0141207 A1 | * | 7/2003 | Pai | 206/335 |
| 2006/0064941 A1 | | 3/2006 | Sollers | |
| 2006/0213846 A1 | | 9/2006 | Edwards et al. | |
| 2009/0078660 A1 | * | 3/2009 | Kin | 211/60.1 |

* cited by examiner

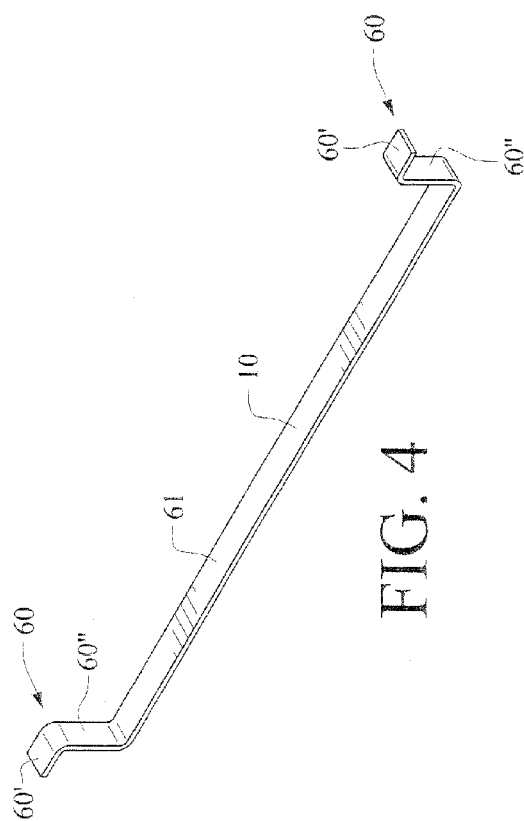
FIG. 3
FIG. 4
FIG. 5
FIG. 6

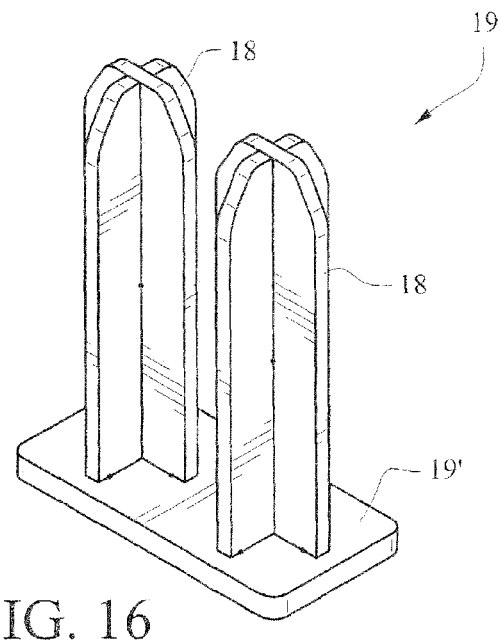
FIG. 16
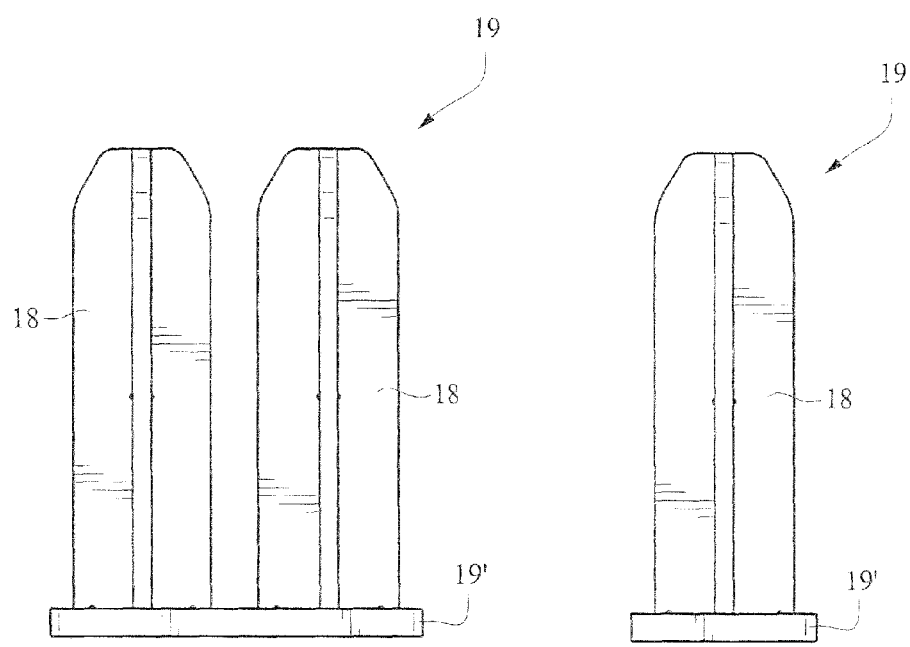
FIG. 17
FIG. 18

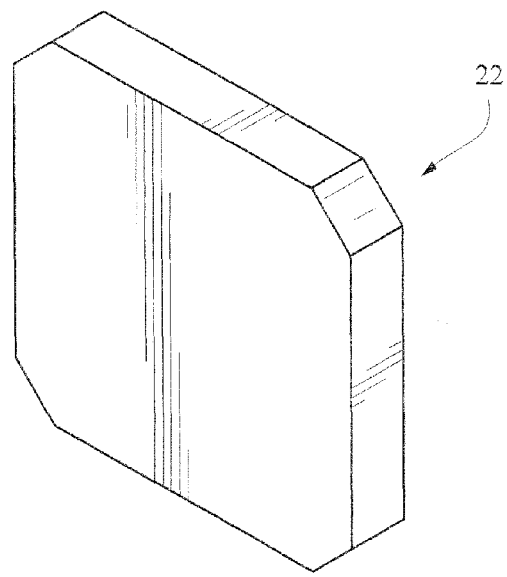
FIG. 22
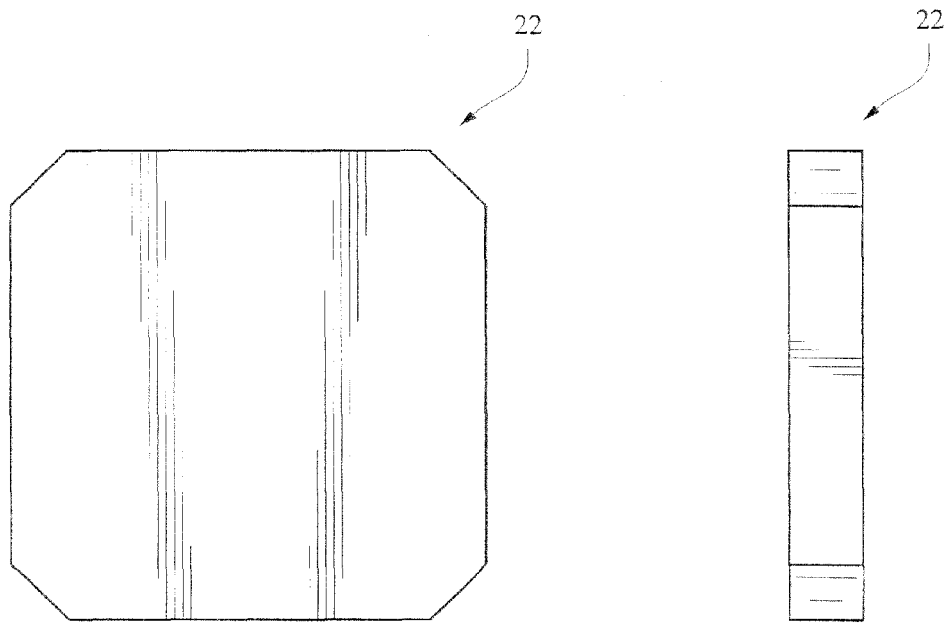
FIG. 23
FIG. 24

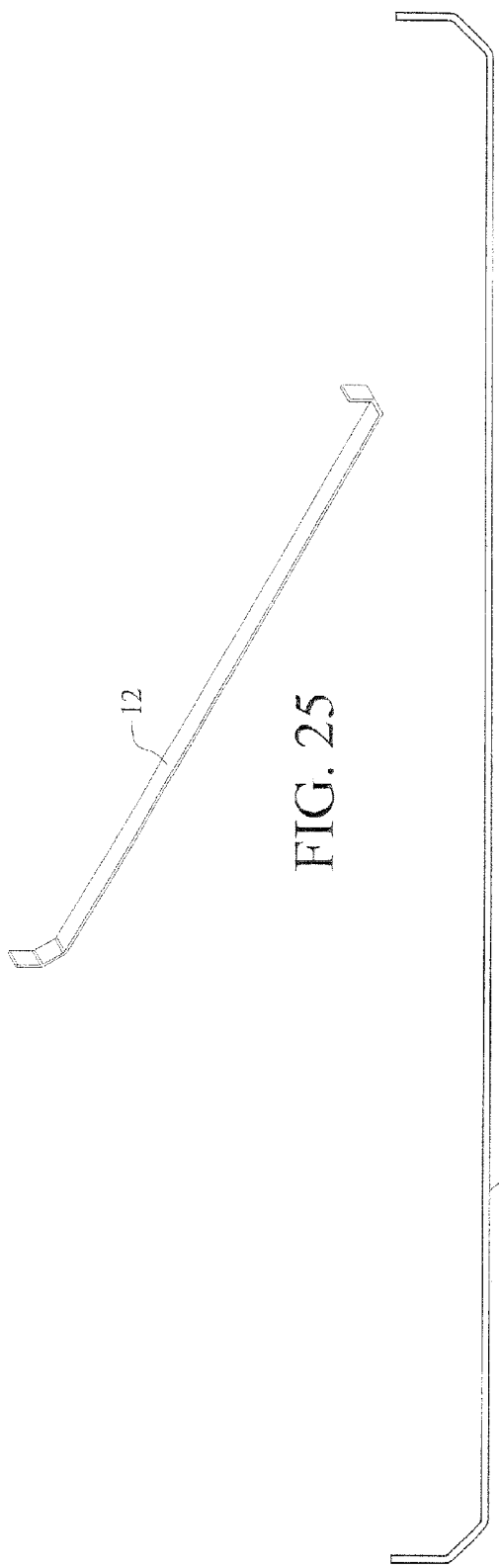
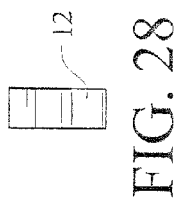
FIG. 25
FIG. 26
FIG. 27
FIG. 28

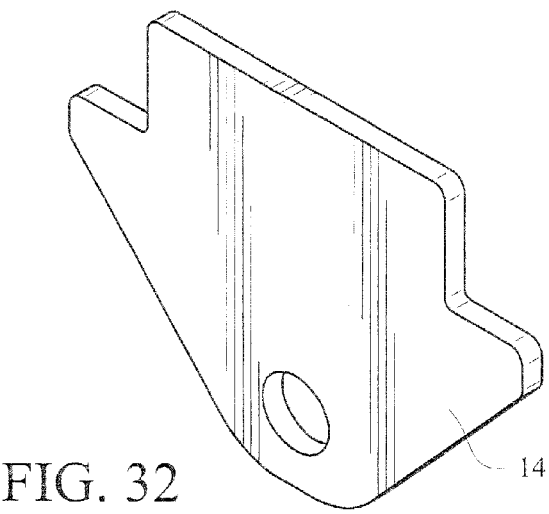
FIG. 32
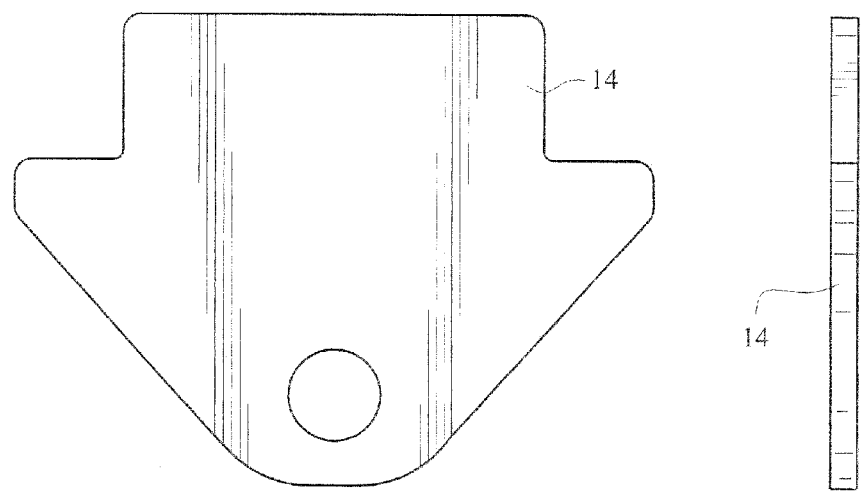
FIG. 33
FIG. 31

PLATFORM SHIPPING RACK CART FOR GLASS SHEETS

Example embodiments of this invention relate to a platform shipping rack cart for supporting and shipping rack(s) (e.g., L-frame rack(s)) upon which glass sheets are mounted. The shipping rack cart may include a plurality of upwardly extending locator projections (e.g., pins) for engaging L-frame racks that hold glass sheets, so as to allow the L-frame rack(s) to be positioned and securely mounted on the cart for shipping and the like. The locator projections are arranged so that first and second L-frame racks may be provided on the cart either facing each other, or in back-to-back position, as desired. The shipping rack cart advantageously allows multiple L-shaped glass racks to be stabilized on the cart and moved at a given time, and allows for loading the glass in either lengthwise or sideways orientations into vans, trailers, or the like.

BACKGROUND OF THE INVENTION

Platforms and racks for storing and shipping glass sheets are known in the art. For example, see U.S. Pat. No. 6,102,206, 2006/0064941 and 2006/0213846, the disclosures of which are hereby incorporated herein by reference. Glass sheets as used herein refers to monolithic glass sheets, laminated glass sheets, flat glass sheets, heat treated glass sheets, annealed glass sheets, coated glass sheets, uncoated glass sheets, and any other suitable type of glass sheets. There exists a need in the art for an improved structure for stabilizing and shipping glass sheets.

L-frame racks for storing glass sheets are known in the art. For example, see the fourth figure of U.S. 2006/0213846 and see the figures and description in U.S. Pat. No. 6,102,206. Conventionally, there is a lack of an efficient cart for moving multiple L-frame racks at a time in a suitable manner. Generally speaking, L-frame racks full of glass sheets are difficult to ship.

It will be appreciated that there exists a need in the art for a more efficient structure and technique for supporting and shipping L-frame rack(s) which are supporting glass sheet(s).

BRIEF SUMMARY OF EXAMPLE EMBODIMENTS OF THE INVENTION

Example embodiments of this invention relate to a platform shipping rack cart for supporting and shipping L-frame rack(s) upon which glass sheets are mounted. The shipping rack cart may include a plurality of upwardly extending locator projections (e.g., pins) for engaging L-frame racks that hold glass sheets, so as to allow the L-frame rack(s) to be positioned and securely mounted on the cart for shipping and the like. The locator projections are arranged so that first and second L-frame racks may be provided on the cart either facing each other, or in back-to-back position, as desired. The shipping rack cart advantageously allows multiple L-shaped glass racks to be stabilized on the cart and moved at a given time, and allows for loading the glass in either lengthwise or sideways orientations into vans, trailers, or the like. While shipping rack carts according to example embodiments of this invention are especially adapted to transport L-frame racks that support glass sheets, the shipping rack carts are not so limited and are also capable of supporting and transporting glass sheets packaged in other ways such as in rectangular structures. The shipping rack carts also advantageously reduce load and unload times, increase transport carrier availability, provide flexibility to ship certain sized glass sheets (e.g., 72"×96" glass sheets) in vans, trailers, or intermodal containers, and make it easier for loads of glass sheets to be pre-staged for increase dock efficiency.

In certain example embodiments of this invention, there is provided a shipping rack cart 1 for supporting multiple L-frame racks, the L-frame racks each for supporting a plurality of glass sheets, the shipping rack cart comprising: first, second, and third substantially parallel and horizontally oriented elongated frame members, wherein the second elongated frame member is located between and substantially coplanar with the first and third elongated frame members, and wherein the first, second and third elongated frame members are adapted to be oriented substantially parallel to the ground; first, second, and third substantially parallel and horizontally oriented elongated cross-frame members, wherein the first, second and third cross-frame members are oriented substantially perpendicular to the first, second and third elongated frame members, and wherein the second elongated cross-frame member is located between and substantially coplanar with the first and third elongated cross-frame members, and wherein the first, second and third elongated cross-frame members are adapted to be oriented substantially parallel to the ground; first and second substantially parallel and elongated end frame members, each of the first and second elongated end frame members being substantially parallel to the first, second and third cross-frame members, wherein the first end frame member is located proximate one end of the shipping rack cart and the second end frame member is located at an opposite end of the shipping rack cart; first, second, third, fourth, fifth, sixth, seventh, and eighth vertically oriented locator projections for engaging and positioning L-frame racks on the shipping rack cart; wherein the first, second, third and fourth vertically oriented locator projections are substantially linearly aligned in this order when viewed from above; wherein the fifth, sixth, seventh, and eighth vertically oriented locator projections are substantially linearly aligned in this order when viewed from above, and wherein when viewed from above a straight line drawn through the first, second, third and fourth locator projections would be substantially parallel to another straight line drawn through the fifth, sixth, seventh and eighth locator projections; wherein the second and third locator projections are located close to each other and are separated from each other by a first distance; wherein centers of the first and second locator projections are separated from each other by a second distance, and wherein centers of the third and fourth projections are separated from each other by substantially the second distance; wherein the sixth and seventh locator projections are located close to each other and are separated from each other by substantially the first distance; wherein centers of the fifth and sixth locator projections are separated from each other by substantially the second distance, and wherein centers of the seventh and eighth projections are separated from each other by substantially the second distance, and wherein the second distance is substantially greater than the first distance.

BRIEF DESCRIPTION OF THE DRAWINGS

FIG. 3 is an end plan view of a support member of the FIG. 1-2 embodiment.

FIG. 4 is a perspective view of the support member of FIG. 3.

FIG. 5 is a side plan view of the support member of FIGS. 3-4.

FIG. 6 is top plan view, prior to any bending, of a flat pattern member that may be used to make the support member of FIGS. 3-5.

FIG. 16 is a perspective view of one of a tandem of upwardly extending projections of the shipping rack cart of FIGS. 1-2, 7 and 9-12.

FIG. 17 is a side plan view of the projection tandem of FIG. 16.

FIG. 18 is an end plan view of the projection tandem of FIGS. 16-17.

FIG. 22 is a perspective view of a horizontally aligned plate of the trailer hitch portion of the shipping rack cart of FIGS. 1-2, 7 and 9-12.

FIG. 23 is a top plan view of the plate of FIG. 22.

FIG. 24 is a side plan view of the plate of FIGS. 22-23.

FIG. 25 is a perspective view of one of the two side support members of the shipping rack cart of FIGS. 1-2, 7 and 9-12.

FIG. 26 is a side plan view of the side support member of FIG. 25.

FIG. 27 is a top plan view, prior to any bending, of a flat pattern member that may be used to make the side support member of FIGS. 25-26.

FIG. 28 is an end plan view of the side support member of FIGS. 25-26.

FIG. 31 is an end plan view of one of the channel support members of the shipping rack cart of FIGS. 1-2, 7, 9-12 and 29-30.

FIG. 32 is a perspective view of the channel support member of FIG. 31.

FIG. 33 is a side plan view of the channel support member of FIGS. 31-32.

DETAILED DESCRIPTION OF EXAMPLE EMBODIMENTS OF THE INVENTION

Referring now more particularly to the accompanying drawings in which like parts represent like parts throughout the figures.

Example embodiments of this invention relate to a platform shipping rack cart 1 for supporting and shipping L-frame rack(s) 2, 2' upon which glass sheets are mounted. While glass sheets are not illustrated in FIGS. 1-33, example glass sheets are illustrated on example L-frame racks in U.S. 2006/0213846 and U.S. Pat. No. 6,102,206 which are both incorporated herein by reference. The platform shipping rack cart 1 provides a safe way to convert static load into a rolling or rollable load. The shipping rack cart 1 may include a plurality of upwardly extending locator projections (e.g., pins) 18 for engaging L-frame racks 2, 2' that hold glass sheets, so as to allow multiple L-frame rack(s) 2 and 2' to be positioned and securely mounted on the cart 1 for shipping and the like. The locator projections 18 are arranged so that first and second L-frame racks 2 and 2' may be provided on the cart 1 either facing each other, or in back-to-back position, as desired. The shipping rack cart 1 advantageously allows multiple L-shaped glass racks 2 and 2' to be simultaneously stabilized on the cart and moved at a given time, and allows for loading the glass in either lengthwise or sideways orientations into vans, trailers, or the like. While shipping rack carts 1 according to example embodiments of this invention are especially adapted to transport L-frame racks 2, 2' that support glass sheets, the shipping rack carts are not so limited and are also capable of supporting and transporting glass sheets packaged in other ways such as in rectangular structures. The shipping rack carts 1 also advantageously reduce load and unload times, increase transport carrier availability, provide flexibility to ship certain sized glass sheets (e.g., 72"×96" glass sheets) in vans, trailers, or intermodal containers, and make it easier for loads of glass sheets to be pre-staged for increase dock efficiency.

Figure 1:
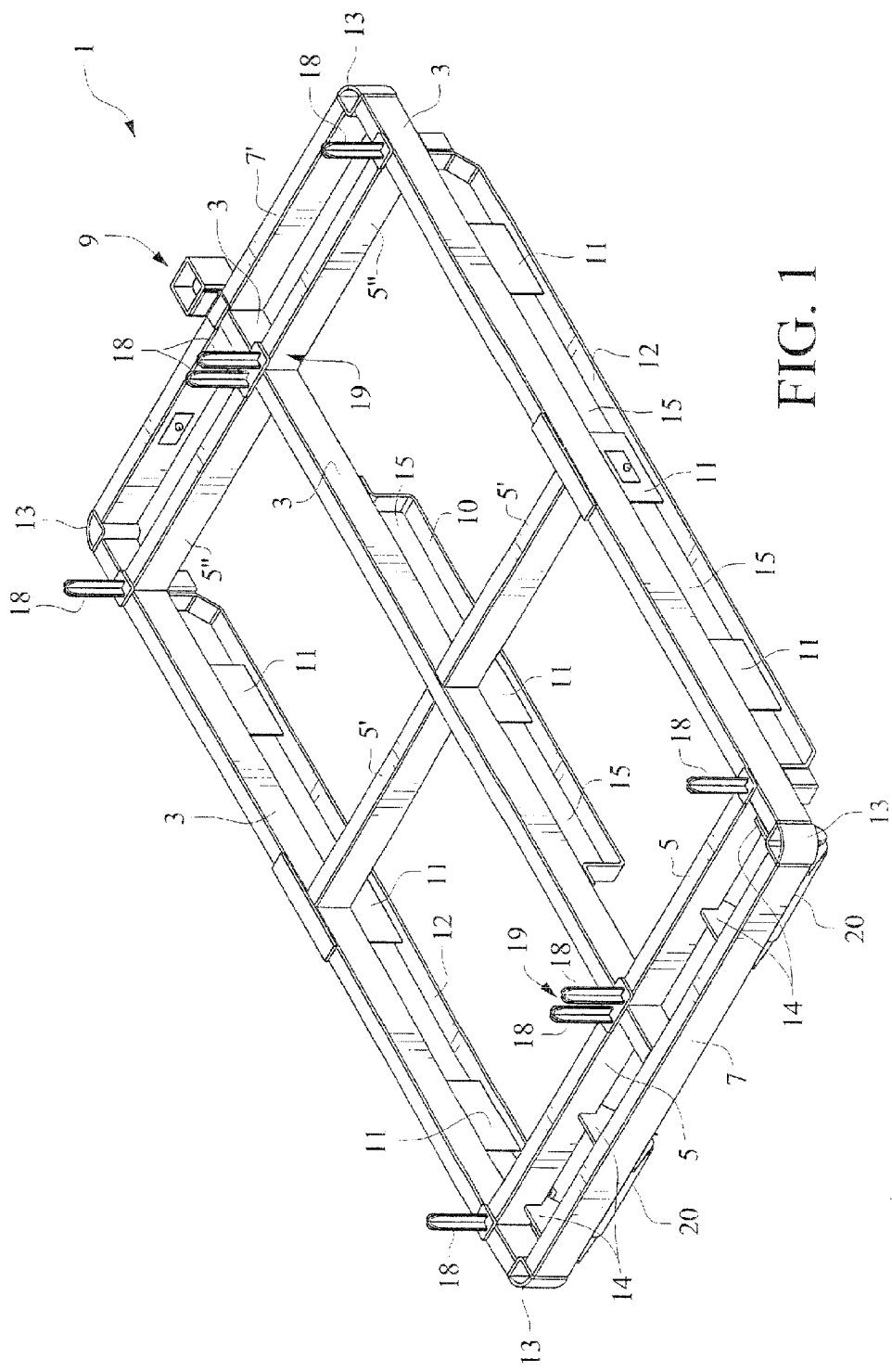
FIG. 1 is a perspective view, from an above angle, of a shipping rack cart according to an example embodiment of this invention.
Figure 2:
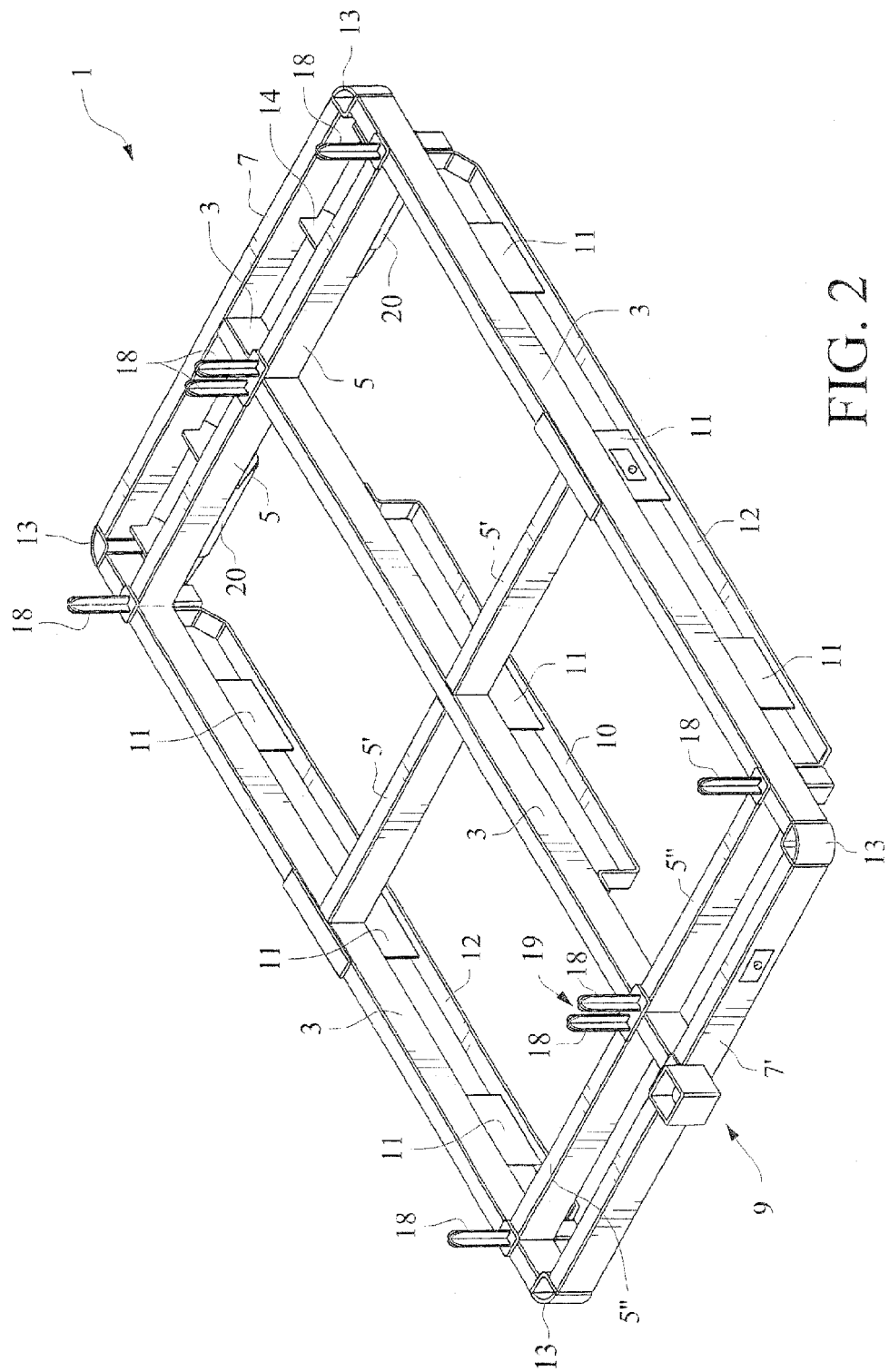
FIG. 2 is a perspective view, from another above angle, of the shipping rack cart of FIG. 1. invention.

FIG. 1 is a perspective view, from an above angle, of a shipping rack cart 1 according to an example embodiment of this invention, and FIG. 2 is a perspective view from another above angle of that shipping rack cart 1. The shipping rack cart 1 includes three elongated and parallel or substantially parallel metal frame members 3. Intersecting with the central frame member 3, there are three elongated and parallel or substantially parallel metal cross-frame members 5, 5' and 5". Each of the frame members 3 and the cross-frame members 5, 5' and 5" are preferably hollow and made of metal. The frame members 3 are preferably perpendicular or substantially perpendicular to and coplanar with the cross-frame members 5, 5' and 5". As shown in FIGS. 1-2, in the preferred embodiment the frame members 3 each have a one-piece construction and each of the cross-frame members 5, 5' and 5" is made up of two linearly aligned pieces that are separated from each other by central frame member 3. However, that need not be the case and in other example embodiments of this invention each cross-frame member 5, 5' and 5" may have a one-piece construction and one, two or all of the frame members 3 may have a two-piece construction so as to be separated by the central cross-frame member 5'. The cart 1 further includes end frame members 7 and 7' at opposing ends of the cart which are parallel or substantially parallel to and coplanar with the cross-frame members 5, 5' and 5". End frame member 7 is at the end of the cart proximate rollers 20, whereas end frame member 7' is at the other end of the cart proximate to and supporting the trailer hitch 9. The cart 1 further includes a support member 10 under and connected to (e.g., via welds or bolts) the central frame member 3, two side support members 12 respectively under and connected to (e.g., via welds or bolts) the outboard frame members 3, and a plurality of vertically oriented and preferably metallic supports (e.g., plate supports) 11 provided between and connected to (e.g., via welds or bolts) the frame members 3 and underlying support members 10, 12. Optionally, metal hollow corner connectors 13 may be provided at each corner of the cart for connecting (e.g., via welds or bolts) outboard frame members 3 to end frame members 7, 7'. Four metal and parallel or substantially parallel channel support members 14 are provided between and connected to (e.g., via welds or bolts) cross-frame member 5 and end frame member 7. The channel support members 14 function in pairs, with each pair of channel support members supporting a respective roller 20 therebetween. Elements 3, 5, 5', 5", 7, 7', and 9-14 are preferably rigidly connected to each other to make up a platform unit that moves/slides/rolls/lifts/lowers together as one unit.

Shipping rack carts 1 according to example embodiments of this invention are typically moved via forklifts or the like, and need not have wheels mounted at the bottom thereof for moving so as to enable the carts to be stable when sitting still in warehouses, on docks, in trailers, vans or containers, and so forth. For example, prongs of a forklift can fit into the openings 15, from either side of the cart 1. Thus, the word "cart" as used herein does not mean that wheels (not shown) are required. While the shipping rack carts 1 herein may optionally have castor wheels mounted under the respective bottoms of corner projections 18 for ease of movement in certain situations, the shipping rack carts 1 need not have wheels mounted thereon.

Figure 29:
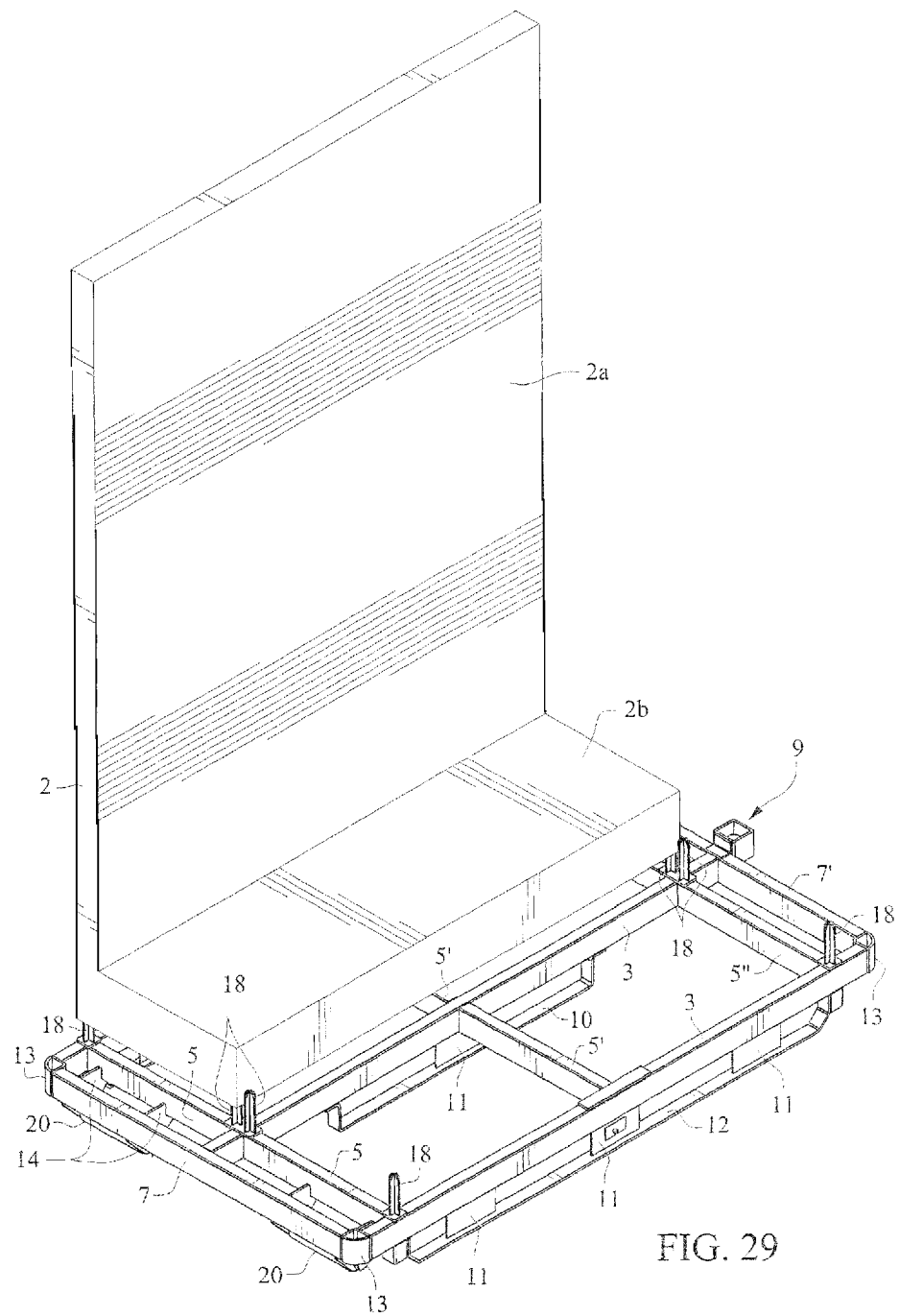
FIG. 29 is perspective view of the shipping rack cart of FIGS. 1-2, 7 and 9-12 supporting an L-frame rack on one half of the cart (no glass sheets shown).
Figure 30:
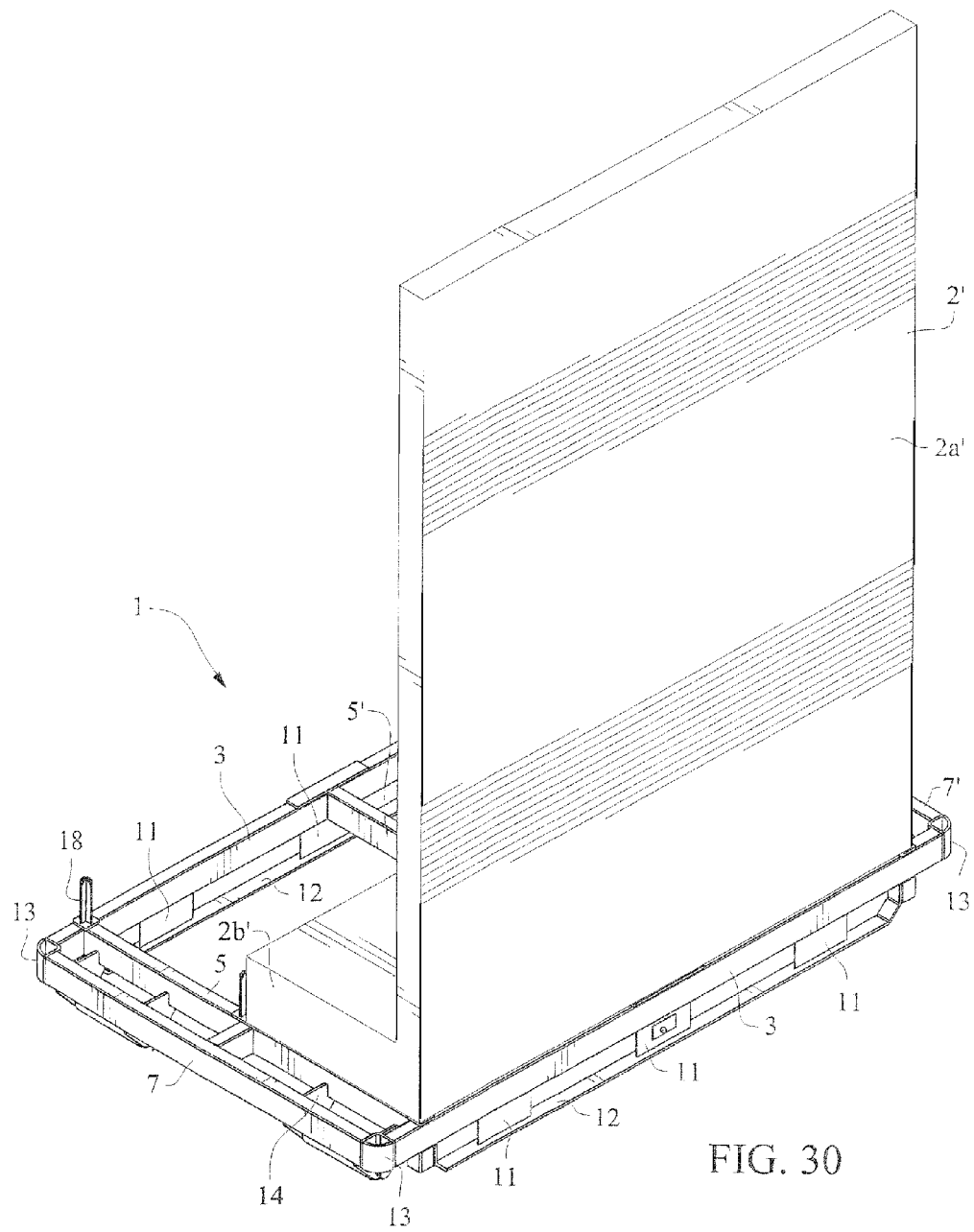
FIG. 30 is perspective view of the shipping rack cart of FIGS. 1-2, 7, 9-12 and 29 supporting another L-frame rack on the other half of the cart (no glass sheets shown).

FIG. 29 illustrates an L-frame rack 2 mounted on the cart 1. The bottom corners of the L-frame rack 2 have openings or voids defined therein which engage with four respective locator projections (e.g., pins) 18 as shown in FIG. 29. Thus, the rack 2 can be stabilized when mounted on the cart 1 for shipping or storage. While glass sheets are not illustrated in FIGS. 1-2 and 29-30, example glass sheets are illustrated on example L-frame racks in U.S. 2006/0213846 and U.S. Pat. No. 6,102,206 which are both incorporated herein by reference—these L-frame racks with glass sheets thereon can be provided on the cart 1 in the manners shown in FIGS. 29-30. Any size glass sheets may be mounted on the racks 2, 2'. While only one L-frame rack 2 is shown on the cart 1 in FIG. 29, a second L-frame rack 2' with glass sheets thereon may simultaneously be mounted on the cart as shown in FIG. 30. When the racks 2 and 2' are both mounted on the cart 1 at the same time in the manners illustrated in FIGS. 29-30, they are considered to be mounted in a face-to-face manner because the vertical wall portions 2a and 2a' are located proximate the outboard edges of the cart and the horizontal bases 2b and 2b' of the racks abut, come close to abutting, or come face-to-face proximate the center of the cart approximately over and along central frame member 3. Thus, the L-frame racks 2 and 2' can be mounted in a face-to-face manner on the cart 1. On the other hand, the design and locations of the locator projections 18 of the cart are such that the same L-frame racks 2 and 2' can instead be mounted in a back-to-back manner on the cart 1. When mounted in a back-to-back manner on the cart 1, the vertical wall portions 2a and 2a' of the respective L-frame racks abut or come close to abutting over and along central frame member 3 proximate a central region of the cart and horizontal bases 2b and 2b' of the respective L-frame racks 2 and 2' extend away from the vertical wall portions 2a and 2a' and away from the central frame member 3. The positions of the locator projections 18 allow both kinds of rack 2, 2' mountings (face-to-face and back-to-back) because distances D1 between locator projections for supporting a given rack are the same or substantially the same as distances D2 between locator projections for supporting another given rack, and longwise locator-to-locator distances D3 and D4 for respective racks are also the same or substantially the same on both sides of the central frame member 3 (e.g., see FIG. 7).

Cart 1 is advantageous in that it allows operator(s) to load the racks 2, 2' in either orientation (lengthwise of widthwise) into a trailer or van for transport. The lengthwise loading capability is advantageous, for example, because absent cart 1 96" glass sheets are typically difficult to load widthwise into a trailer or van (the opening of a trailer can be not much larger than 96 inches (96")). Also, absent cart 1, it is difficult for a fork lift to pick up L-frame racks with 96" glass sheets thereon in a lengthwise direction without damaging the glass. The cart 1 advantageously may be sized so as to prevent the forklift from contacting and damaging such large glass sheets when picking up the cart 1 with L-frame racks 2, 2' thereon. In certain example embodiments of this invention, the cart 1 may have a length of about 100 inches and a width of about 60 inches.

FIG. 3 is an end plan view of support member 10; FIG. 4 is a perspective view of the support member 10; and FIG. 5 is a side plan view of the support member 10. In example embodiments, support member 10 is adapted to be located under the central frame member 3 as shown in FIGS. 1-2, and has two foot sections 60 at ends thereof that are connected to each other by an elongated connection section 61. The connection section 61 is adapted to be parallel or substantially parallel to both the ground and frame members 3. Each foot section 60 includes a base 60' that is substantially parallel to connection section 61, and a vertical member 60" that connects 61 to 60'. FIG. 6 is top plan view, prior to any bending, of a flat pattern member that may be used to make the support member 10. The metal flat pattern member of FIG. 6 may be bent proximate ends thereof to form foot sections 60.

Figure 7:
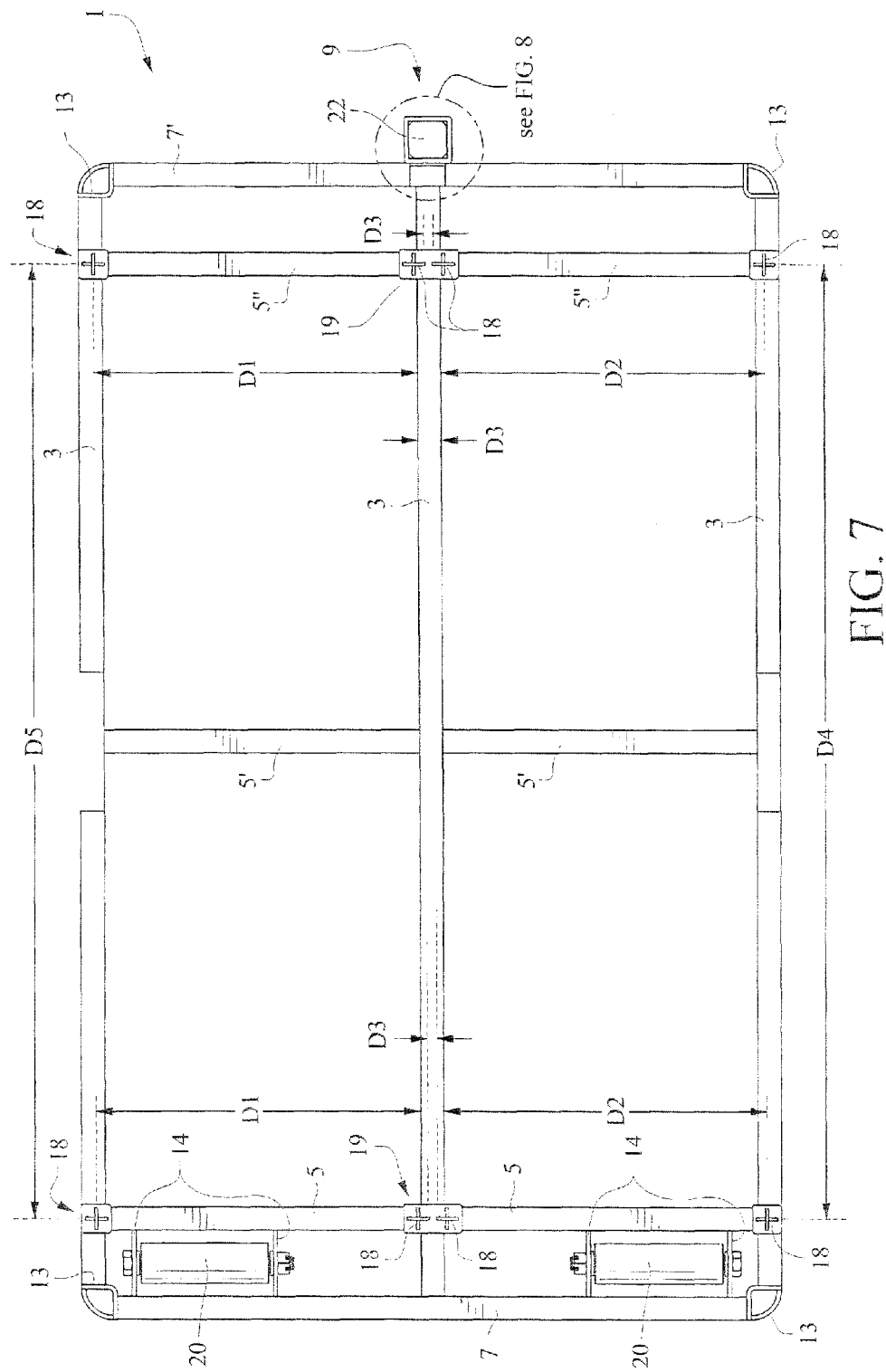
FIG. 7 is a top plan view of the shipping rack cart of FIGS. 1-2.
Figure 8:
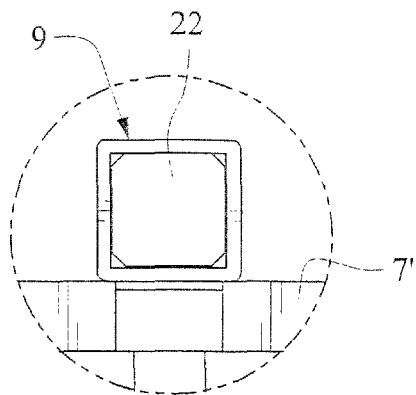
FIG. 8 is an enlarged top plan view of a portion of the shipping rack cart of FIGS. 1-2 and 7 that may be used as a trailer hitch so that the cart may be towed/pulled by fitting with a trailer ball.

FIG. 7 is a top plan view of the shipping rack cart 1 of FIGS. 1-2. As perhaps best shown in FIG. 7, first and second rollers 20 are provided proximate one end of the cart 1 in between and supported by cross frame member 5 and end frame member 7. If the cart 1 is being pushed or towed via trailer hitch 9, then the rollers 20 protect the end of the trailer from bottoming/grounding out. Optionally, it is possible for the rollers 20 to serve as supporting rollers during pushing/pulling the cart 1 via trailer hitch 9 when the end of the cart 1 proximate hitch 9 is raised up for placement on a trailer ball, where the gap in the underside of hitch 9 fits over the trailer ball (not shown). FIG. 8 is an enlarged top plan view illustrating the hitch 9 which allows the cart to be towed/pulled/pushed by fitting/engaging the hitch 9 with a trailer ball.

Figure 9:
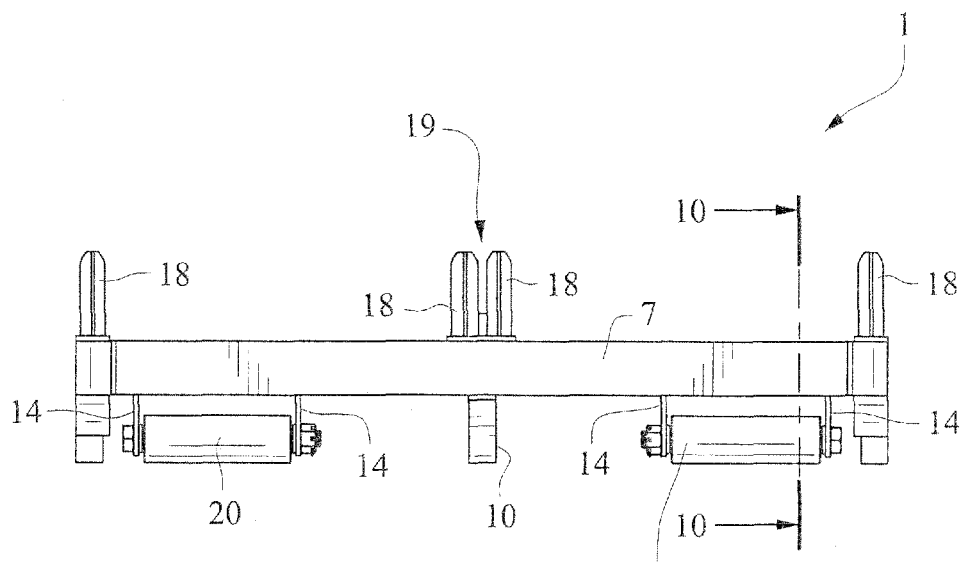
FIG. 9 is an end plan view of the shipping rack cart of FIGS. 1-2 and 7, taken of the end of the shipping rack cart opposite the end on which the trailer hitch is mounted.
Figure 10:
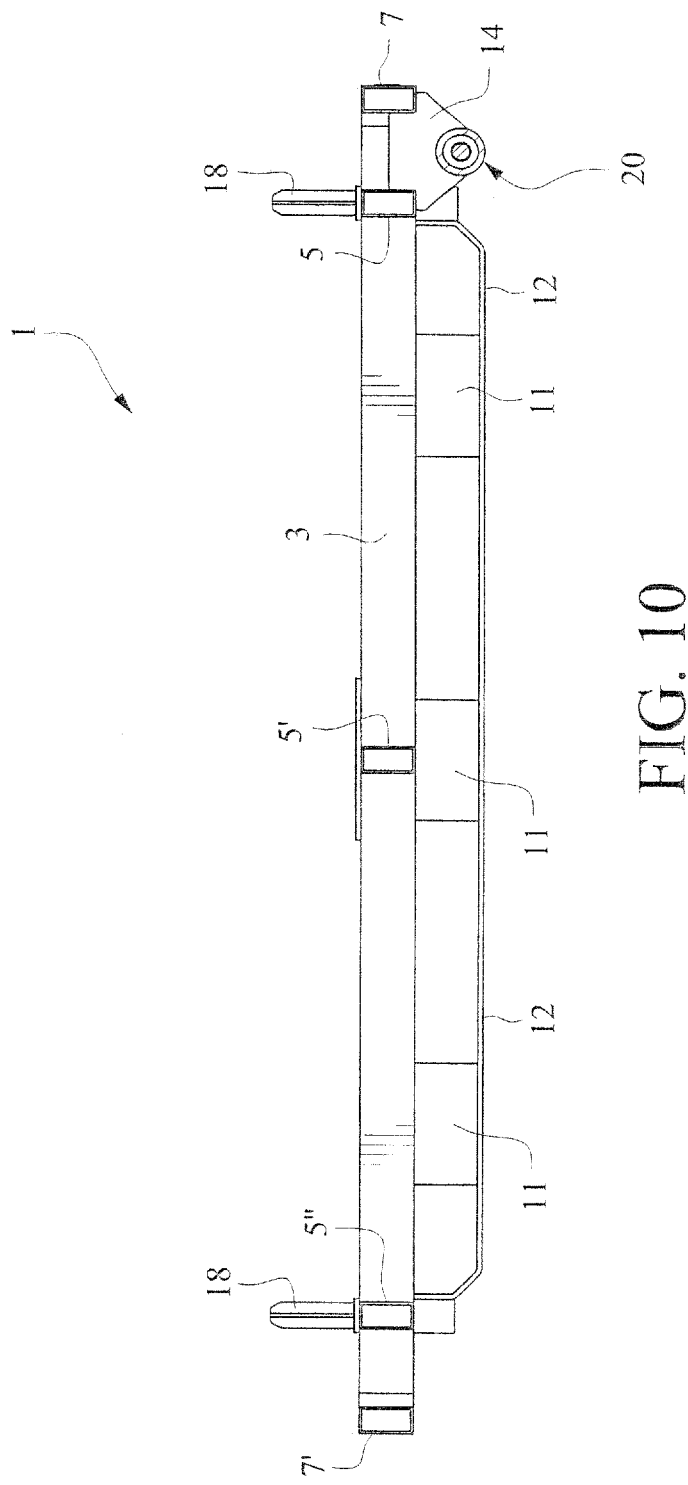
FIG. 10 is a side plan view of the shipping rack cart of FIGS. 1-2, 7 and 9.
Figure 11:
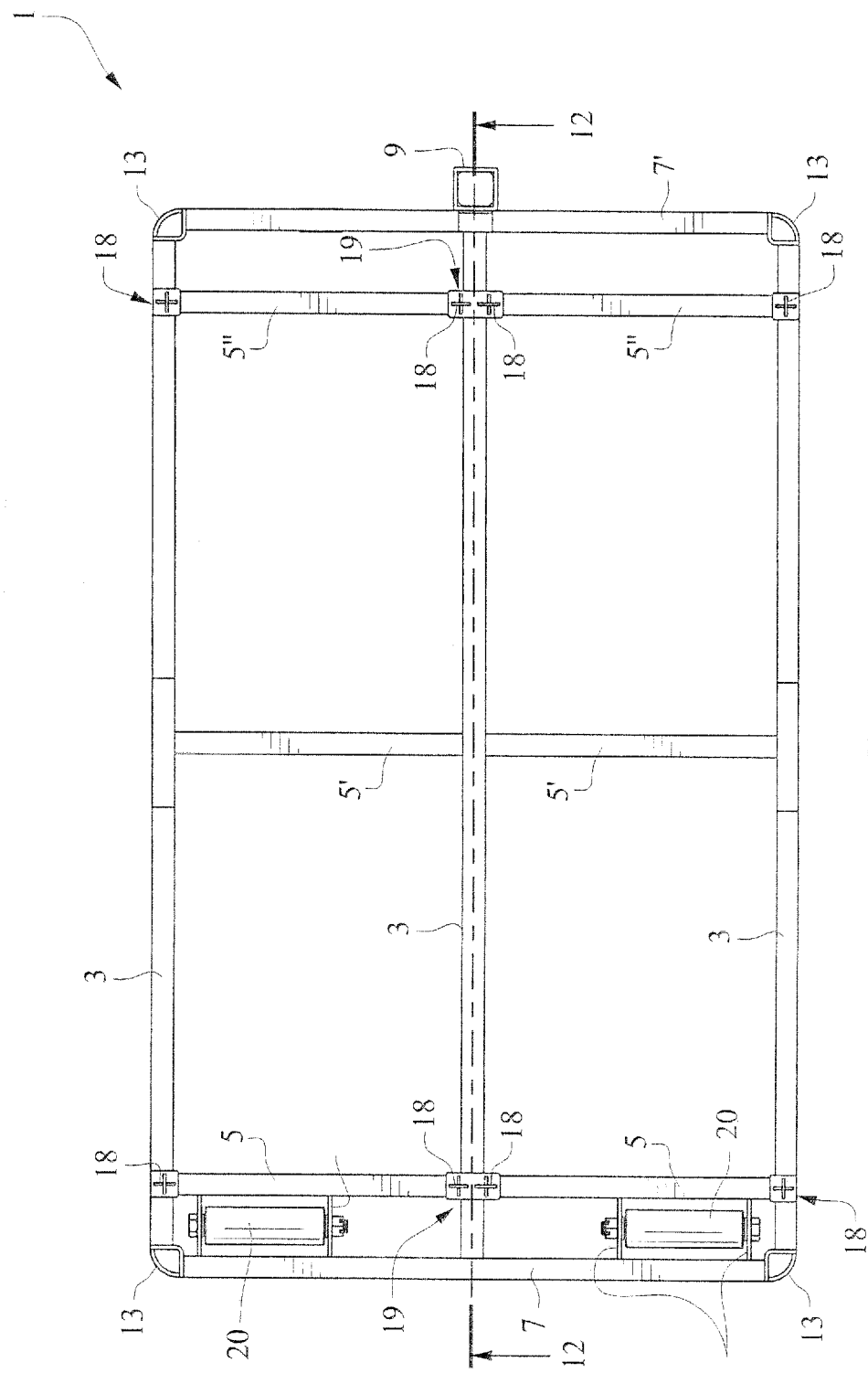
FIG. 11, similar to FIG. 7, is a top plan view of the shipping rack cart of FIGS. 1-2, 7 and 9-10.

FIG. 9 is an end plan view of the shipping rack cart of FIGS. 1-2 and 7, taken of the end of the shipping rack cart opposite the end on which the trailer hitch is mounted; and FIG. 10 is a side plan view of the shipping rack cart of FIGS. 1-2, 7 and 9. FIG. 11, similar to FIG. 7, is a top plan view of the shipping rack cart of FIGS. 1-2, 7 and 9-10.

Figure 12:
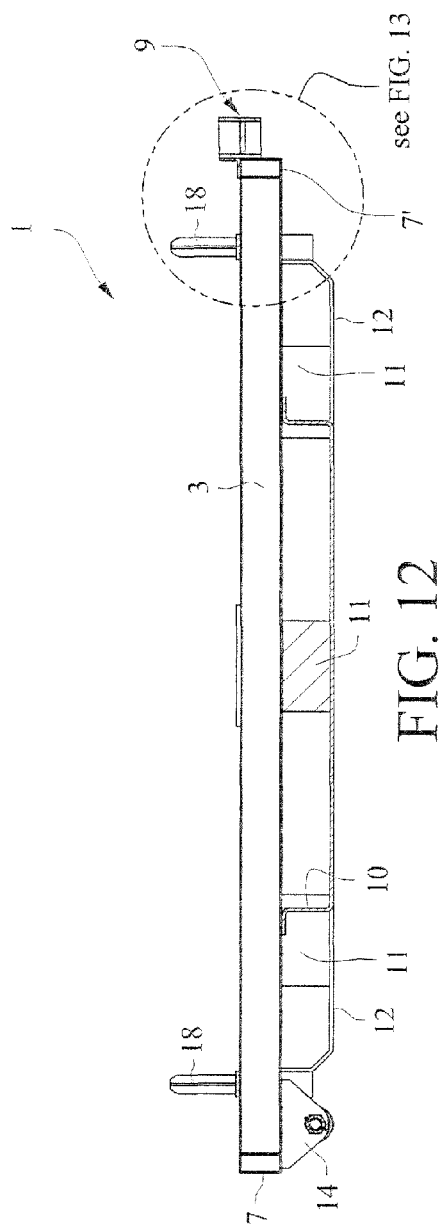
FIG. 12 is a side cross-sectional view of the shipping rack cart of FIGS. 1-2, 7 and 9-11, the cross section being taken along the line 12-12 in FIG. 11.
Figure 13:
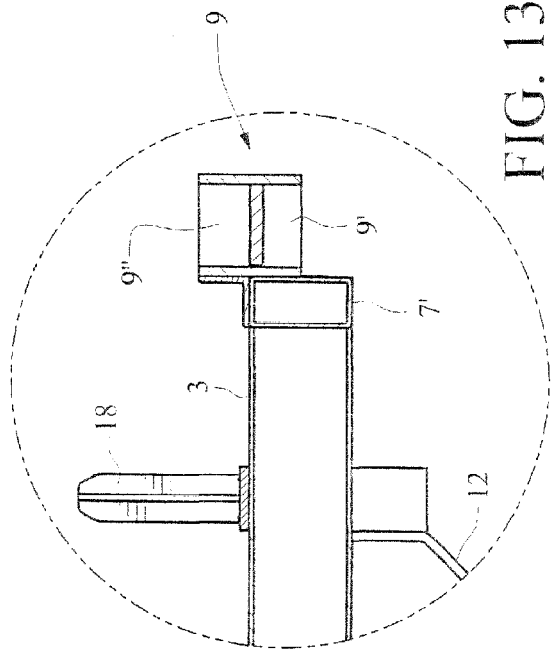
FIG. 13 is an enlarged side cross sectional view, of the circled area in FIG. 12, of a portion of the shipping rack cart that may be used as a trailer hitch so that a ball may be used to tow/pull the shipping rack cart.

FIG. 12 is a side cross-sectional view of the shipping rack cart of FIGS. 1-2, 7 and 9-11, the cross section being taken along the line 12-12 in FIG. 11; and FIG. 13 is an enlarged side cross sectional view of the circled area in FIG. 12, illustrating the hitch portion 9 of the shipping rack cart 1. The hitch 9 is supported by one or both of members 7' and 3 at one end of the cart 1. The hitch has a cavity 9' at the underside thereof, and another cavity 9" at the upper side thereof in example embodiments, although only one cavity is provided in certain embodiments. In certain example embodiments, the end of the cart 1 may be lifted and the cavity 9' fit onto a trailer "ball" so that the cart 1 can be pushed/pulled/moved/rolled via the hitch for convenient transport thereof.

Figure 14:
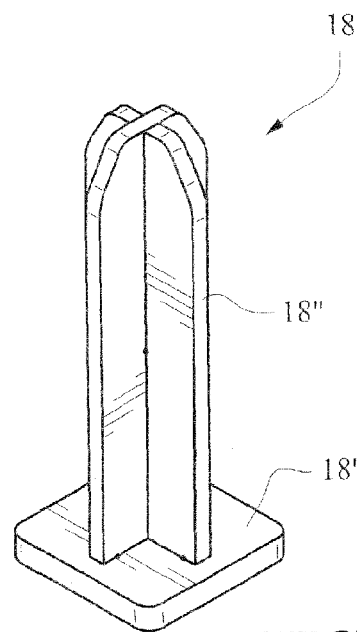
FIG. 14 is a perspective view of one of the upwardly extending single projections of the shipping rack cart of FIGS. 1-2, 7 and 9-12.
Figure 15:
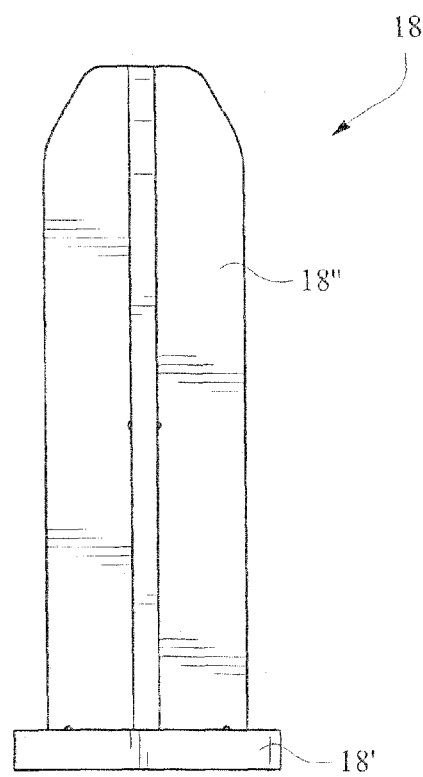
FIG. 15 is a side plan view of the single projection of FIG. 14.

FIG. 14 is a perspective view of one of the upwardly extending single projections 18 of the shipping rack cart of FIGS. 1-2, 7 and 9-12; and FIG. 15 is a side plan view of the projection 18. As illustrated, projections 18 are all elongated and are all cross-shaped or x-shaped as viewed from above in certain example embodiments of this invention, although they may be otherwise shaped in other embodiments of this invention. In alternative embodiments, the projections may be circle-shaped, square shaped, or rectangle-shaped as viewed from above so long as they fit into respective cavity(ies) defined in the bottom of an L-frame rack 2, 2' in order to stabilize the position of the rack on the cart 1. In certain example embodiments of this invention, each projection may have both a base portion 18' and a projection portion 18". The base portion 18' may be substantially planar in shape. In certain example embodiments, each projection portion 18" may extend upwardly above the frame members 3 as viewed from the side to a height of from about four to eight inches, more preferably from about five to seven inches, above the top of the frame members 3. The four projections 18 at the respectively four corners of the cart 1 are singular projections. However, the projections over or proximate the central frame member 3 may be tandem projections, each tandem including a base 19' common to a pair of projections 18. FIG. 16 is a perspective view of such a projection tandem including a base 19' that supports first and second projections 18; FIG. 17 is a side plan view of the projection tandem of FIG. 16; and FIG. 18 is an end plan view of the projection tandem of FIGS. 16-17. The projections 18 of the tandem structures 19 typically extend upwardly to approximately the same height above frame members 3 as to singular projections 18 at the corners of the cart 1.

Figure 19:
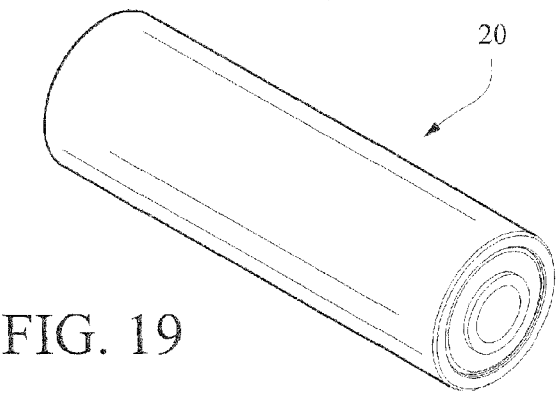
FIG. 19 is a perspective view of one of the rollers of the shipping rack cart of FIGS. 1-2, 7 and 9-12.
Figure 20:
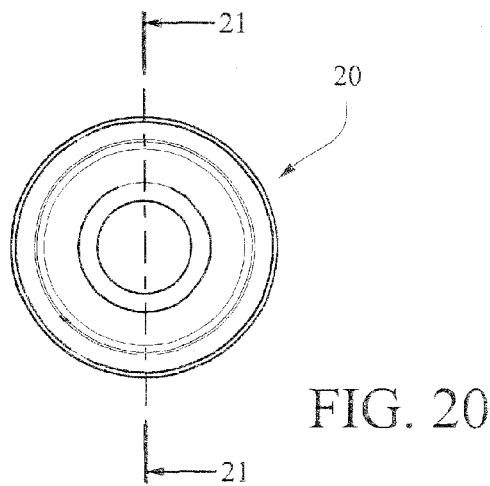
FIG. 20 is an end plan view of the roller of FIG. 19.
Figure 21:
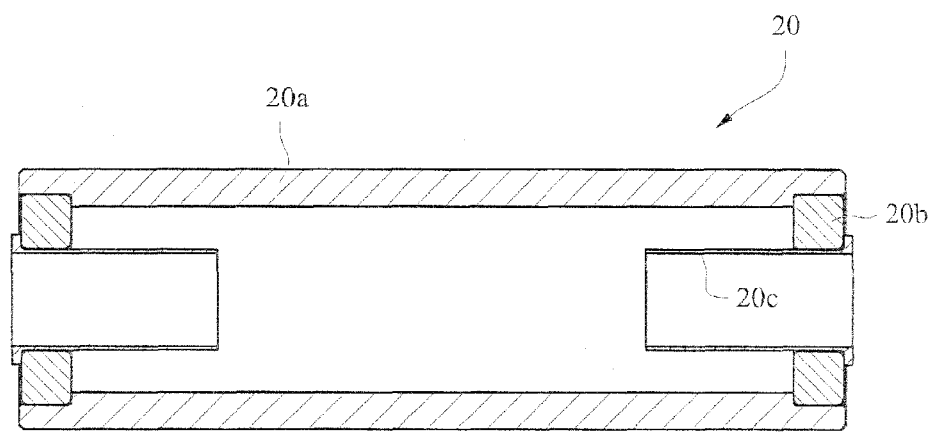
FIG. 21 is a cross-sectional view of the roller of FIGS. 19-20, taken along the line 21-21 in FIG. 20.

FIG. 19 is a perspective view of one of the rollers 20 of the shipping rack cart 1 of FIGS. 1-2, 7 and 9-12; FIG. 20 is an end plan view of the roller 20; and FIG. 21 is a cross-sectional view of the roller 20 of FIGS. 19-20 taken along the line 21-21 in FIG. 20. As shown in FIGS. 1-2 and 7, a pair of such rollers may be provided on the cart 1. Each roller 20 may include an exterior tube 20a, bearings 20b, and bushings 20c. The bearings 20b are provided between the bushings 20c and the outer tube 20a. The roller structure of FIGS. 19-21 fits in between a pair of channel support members 14 (e.g., see FIGS. 7 and 11), and a long bolt can fit though the holes in the channel support members 14 and the bushings 20c with its end being fitted with a nut in order to secure the roller 20 in place between the members 14. FIG. 31 is an end plan view of one of the channel support members 14; FIG. 32 is a perspective view of the channel support member 14; and FIG. 33 is a side plan view of the channel support member 14.

In example embodiments of this invention, there is provided a shipping rack cart 1 for supporting multiple L-frame racks 2 and 2', the L-frame racks 2 and 2' each for supporting a plurality of glass sheets, the shipping rack cart 1 comprising: first, second, and third substantially parallel and horizontally oriented elongated frame members 3, wherein the second elongated frame member is located between and substantially coplanar with the first and third elongated frame members, and wherein the first, second and third elongated frame members 3 are adapted to be oriented substantially parallel to the ground; first, second, and third substantially parallel and horizontally oriented elongated cross-frame members 5, 5' and 5", wherein the first, second and third cross-frame members 5, 5', 5" are oriented substantially perpendicular to the first, second and third elongated frame members 3, and wherein the second elongated cross-frame member 5' is located between and substantially coplanar with the first and third elongated cross-frame members 5 and 5", and wherein the first, second and third elongated cross-frame members 5, 5' and 5" are adapted to be oriented substantially parallel to the ground; first and second substantially parallel and elongated end frame members 7 and 7', each of the first and second elongated end frame members 7 and 7' being substantially parallel to the first, second and third cross-frame members 5, 5' and 5", wherein the first end frame member 7 is located proximate one end of the shipping rack cart 1 and the second end frame member 7' is located at an opposite end of the shipping rack cart 1; first, second, third, fourth, fifth, sixth, seventh, and eighth vertically oriented locator projections 18 for engaging and positioning L-frame racks 2 and 2' on the shipping rack cart; wherein the first, second, third and fourth vertically oriented locator projections (e.g., see the projections 18 at the left side of FIG. 1 along member 5) are substantially linearly aligned in this order when viewed from above; wherein the fifth, sixth, seventh, and eighth vertically oriented locator projections 18 (e.g., see the projections 18 at the right side of FIG. 1 along member 5") are substantially linearly aligned in this order when viewed from above, and wherein when viewed from above a straight line drawn through the first, second, third and fourth locator projections would be substantially parallel to another straight line drawn through the fifth, sixth, seventh and eighth locator projections; wherein the second and third locator projections (e.g., see the two inboard projections at the left side of FIG. 1 located proximate the intersection of cross-frame member 5 and the central frame member 3) are located close to each other and are separated from each other by a first distance (see D3 in FIG. 7); wherein centers of the first and second locator projections are separated from each other by a second distance (see D1 in FIG. 7), and wherein centers of the third and fourth projections are separated from each other by substantially the second distance (see D2 which is substantially equal to D1 in FIG. 7); wherein the sixth and seventh locator projections are located close to each other and are separated from each other by substantially the first distance (see D3 in FIG. 7); wherein centers of the fifth and sixth locator projections are separated from each other by substantially the second distance (see D1 in FIG. 7), and wherein centers of the seventh and eighth projections are separated from each other by substantially the second distance (see D2 which is substantially equal to D1 in FIG. 7), and wherein the second distance (D1, D2) is substantially greater than the first distance (D3).

In the shipping rack cart of the immediately preceding paragraph, each of said first, second and third elongated frame members 3 may be made up of a single continuous piece and not be separated into a plurality of parts, or alternatively each of said first, second and third elongated frame members 3 may comprise a plurality of linearly aligned pieces.

In the shipping rack cart of any of the preceding two paragraphs, the first, second and third cross-frame members 5, 5' and 5" may be coplanar with the first, second and third elongated frame members 3.

In the shipping rack cart of any of the preceding three paragraphs, each of said first, second and third cross-frame members 5, 5' and 5" may be made up of a single continuous piece and not be separated into a plurality of parts, or alternatively each of said first, second and third cross-frame members 5, 5' and 5" may comprise a plurality of spaced apart linearly aligned pieces as illustrated in the figures.

In the shipping rack cart of any of the preceding four paragraphs, the first and second end frame members 7 and 7' may be coplanar with the first, second and third cross members 5, 5' and 5", and may also be coplanar with the first, second and third frame members 3.

In the shipping rack cart of any of the preceding five paragraphs, the first, second, third and fourth locator projections may overlap with and/or be linearly aligned with the first cross-frame member 5 when viewed from above.

In the shipping rack cart of any of the preceding six paragraphs, the fifth, sixth, seventh and eighth locator projections may overlap with and/or be linearly aligned with the third cross-frame member 5" when viewed from above.

In the shipping rack cart of any of the preceding seven paragraphs, the first and fifth locator projections (e.g., see the two uppermost projections 18 in FIG. 7) may overlap with and/or be linearly aligned with the first elongated frame member 3 when viewed from above, and the fourth and eighth locator projections (e.g., see the two lowermost projections 18 in FIG. 7) may overlap with and/or be linearly aligned with the third elongated frame member 3 when viewed from above.

In the shipping rack cart of any of the preceding eight paragraph, a distance between the first end frame member 7 and the first cross-frame member 5 may be substantially less than a distance between the first and second cross-frame members 5 and 5'.

In the shipping rack of any of the preceding nine paragraphs, a distance between the second end frame member 7' and the third cross-frame member 5" may be substantially less than a distance between the second and third cross-frame members 5' and 5".

In the shipping rack cart of any of the preceding ten paragraphs, each of said locator projections 18 may extend upwardly to a height of from about four to eight inches above a top of the first elongated frame member 3 as viewed from the side.

In the shipping rack cart of any of the preceding eleven paragraphs, the first distance may be from about 0.1 to 4.0 inches, and the second distance may be from about 20 to 40 inches.

In the shipping rack cart of any of the preceding twelve paragraphs, the first distance may be from about 0.15 to 2.0 inches, and the second distance may be from about 25 to 35 inches.

In the shipping rack cart of any of the preceding thirteen paragraphs, the second distance may be greater than the first distance by at least 20 inches, more preferably by at least 24 inches.

The shipping rack cart of any of the preceding fourteen paragraphs may further include at least one roller 20 that is located between the first end frame member 7 and the first cross-frame member 5 as viewed from above, and wherein the roller 20 may be at least partially located at an elevation below an elevation of the first end frame member 7 as viewed from the side.

The shipping rack cart of any of the preceding fifteen paragraphs may further include a hitch 9 connected to an end of the cart proximate the second end frame member 7', so that the first, second and third cross frame members 5, 5' and 5" are located between the hitch 9 and the first end frame member 7 as viewed from above.

In the shipping rack cart of any of the preceding sixteen paragraphs, the first and fifth locator projections may be separated from each other by a third distance (e.g., see D5 or D4 in FIG. 7), and wherein the fourth and eighth locator projections may be separated from each other by substantially the third distance (e.g., see D5 or D4 in FIG. 7), and wherein the third distance (D4, D5) is greater than the second distance and may be from about 60 to 100 inches.

In the shipping rack cart of any of the preceding seventeen paragraphs, each of said locator projections 18 may be substantially x-shaped as viewed in cross section from above.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A shipping rack cart for supporting multiple L-frame racks, the L-frame racks each for supporting a plurality of glass sheets, the shipping rack cart comprising:

first, second, and third substantially parallel and horizontally oriented elongated frame members, wherein the second elongated frame member is located between and substantially coplanar with the first and third elongated frame members, and wherein the first, second and third elongated frame members are adapted to be oriented substantially parallel to the ground;

first, second, and third substantially parallel and horizontally oriented elongated cross-frame members, wherein the first, second and third cross-frame members are oriented substantially perpendicular to the first, second and third elongated frame members, and wherein the second elongated cross-frame member is located between and substantially coplanar with the first and third elongated cross-frame members, and wherein the first, second and third elongated cross-frame members are adapted to be oriented substantially parallel to the ground;

first and second substantially parallel and elongated end frame members, each of the first and second elongated end frame members being substantially parallel to the first, second and third cross-frame members, wherein the first end frame member is located proximate one end of the shipping rack cart and the second end frame member is located at an opposite end of the shipping rack cart;

first, second, third, fourth, fifth, sixth, seventh, and eighth vertically oriented locator projections for engaging and positioning L-frame racks on the shipping rack cart;

wherein the first, second, third and fourth vertically oriented locator projections are substantially linearly aligned when viewed from above;

wherein the fifth, sixth, seventh, and eighth vertically oriented locator projections are substantially linearly aligned when viewed from above, and wherein when viewed from above a straight line drawn through the first, second, third and fourth locator projections would be substantially parallel to another straight line drawn through the fifth, sixth, seventh and eighth locator projections;

wherein the second and third locator projections are located close to each other and are separated from each other by a first distance;

wherein centers of the first and second locator projections are separated from each other by a second distance, and wherein centers of the third and fourth projections are separated from each other by substantially the second distance;

wherein the sixth and seventh locator projections are located close to each other and are separated from each other by substantially the first distance;

wherein centers of the fifth and sixth locator projections are separated from each other by substantially the second distance, and wherein centers of the seventh and eighth projections are separated from each other by substantially the second distance, wherein the second distance is substantially greater than the first distance; and wherein the first, second and third cross-frame members are coplanar with the first, second and third elongated frame members.

2. The shipping rack cart of claim 1, wherein each of said first, second and third elongated frame members is made up of a single continuous piece and is not separated into a plurality of parts.

3. The shipping rack cart of claim 1, wherein each of said first, second and third elongated frame members comprises a plurality of linearly aligned pieces.

4. The shipping rack cart of claim 1, wherein each of said first, second and third cross-frame members is made up of a single continuous piece and is not separated into a plurality of parts.

5. The shipping rack cart of claim 1, wherein each of said first, second and third cross-frame members comprises a plurality of spaced apart linearly aligned pieces.

6. The shipping rack cart of claim 1, wherein the first, second, third and fourth locator projections overlap with the first cross-frame member when viewed from above; and wherein the fifth, sixth, seventh and eighth locator projections overlap with the third cross-frame member when viewed from above.

7. The shipping rack cart of claim 1, wherein the first and fifth locator projections overlap with the first elongated frame member when viewed from above, and wherein the fourth and eighth locator projections overlap with the third elongated frame member when viewed from above.

8. The shipping rack cart of claim 1, wherein a distance between the first end frame member and the first cross-frame member is substantially less than a distance between the first and second cross-frame members.

9. The shipping rack cart of claim 1, wherein a distance between the second end frame member and the third cross-frame member is substantially less than a distance between the second and third cross-frame members.

10. The shipping rack cart of claim 1, wherein each of said locator projections extends upwardly to a height of from about four to eight inches above a top of the first elongated frame member as viewed from the side.

11. The shipping rack cart of claim 1, wherein the first distance is from about 0.1 to 4.0 inches, and the second distance is from about 20 to 40 inches.

12. The shipping rack cart of claim 1, wherein the first distance is from about 0.15 to 2.0 inches, and the second distance is from about 25 to 35 inches.

13. The shipping rack cart of claim 1, wherein the second distance is greater than the first distance by at least 20 inches.

14. The shipping rack cart of claim 1, wherein the second distance is greater than the first distance by at least 24 inches.

15. The shipping rack cart of claim 1, further comprising a roller that is located between the first end frame member and the first cross-frame member as viewed from above, and wherein the roller is at least partially located at an elevation below an elevation of the first end frame member as viewed from the side.

16. The shipping rack cart of claim 1, further comprising a hitch connected to an end of the cart proximate the second end frame member, so that the first, second and third cross frame members are located between the hitch and the first end frame member as viewed from above.

17. The shipping rack cart of claim 1, wherein the first and fifth locator projections are separated from each other by a third distance, and wherein the fourth and eighth locator projections are separated from each other by substantially the third distance, and wherein the third distance is greater than the second distance and is from about 60 to 100 inches.

18. The shipping rack cart of claim 1, wherein each of said locator projections is substantially x-shaped as viewed in cross section from above.

19. A shipping rack cart for supporting multiple L-frame racks, the L-frame racks each for supporting a plurality of glass sheets, the shipping rack cart comprising:

first, second, and third substantially parallel and horizontally oriented elongated frame members, wherein the second elongated frame member is located between and substantially coplanar with the first and third elongated frame members, and wherein the first, second and third elongated frame members are adapted to be oriented substantially parallel to the ground;

first, second, and third substantially parallel and horizontally oriented elongated cross-frame members, wherein the first, second and third cross-frame members are oriented substantially perpendicular to the first, second and third elongated frame members, and wherein the second elongated cross-frame member is located between and substantially coplanar with the first and third elongated cross-frame members, and wherein the first, second and third elongated cross-frame members are adapted to be oriented substantially parallel to the ground;

first and second substantially parallel and elongated end frame members, each of the first and second elongated end frame members being substantially parallel to the first, second and third cross-frame members, wherein the first end frame member is located proximate one end of the shipping rack cart and the second end frame member is located at an opposite end of the shipping rack cart;

first, second, third, fourth, fifth, sixth, seventh, and eighth vertically oriented locator projections for engaging and positioning L-frame racks on the shipping rack cart;

wherein the first, second, third and fourth vertically oriented locator projections are substantially linearly aligned when viewed from above;

wherein the fifth, sixth, seventh, and eighth vertically oriented locator projections are substantially linearly aligned when viewed from above, and wherein when viewed from above a straight line drawn through the first, second, third and fourth locator projections would be substantially parallel to another straight line drawn through the fifth, sixth, seventh and eighth locator projections;

wherein the second and third locator projections are located close to each other and are separated from each other by a first distance;

wherein centers of the first and second locator projections are separated from each other by a second distance, and wherein centers of the third and fourth projections are separated from each other by substantially the second distance;

wherein the sixth and seventh locator projections are located close to each other and are separated from each other by substantially the first distance;

wherein centers of the fifth and sixth locator projections are separated from each other by substantially the second distance, and wherein centers of the seventh and eighth projections are separated from each other by substantially the second distance, wherein the second distance is substantially greater than the first distance; and wherein the first and second end frame members are coplanar with the first, second and third cross members and also with the first, second and third frame members.

20. The shipping rack cart of claim 19, wherein the first, second and third cross-frame members are coplanar with the first, second and third elongated frame members.

* * * * *